Oct. 10, 1967  C. B. PAGE, JR  3,346,117

DE-EMULSIFYING APPARATUS

Filed June 9, 1965

3,346,117
DE-EMULSIFYING APPARATUS
Charles B. Page, Jr., Marrero, La., assignor to Texaco Inc., New York, N.Y., a corporation of Delaware
Filed June 9, 1965, Ser. No. 462,655
3 Claims. (Cl. 210—304)

ABSTRACT OF THE DISCLOSURE

A centrifugal acting de-emulsifying choke unit. This choke is adapted for connection to a high pressure oil well which produces water and oil. It has coils for gradual reduction of pressure while applying centrifugal force to the fluid flowing through the coils for separating the water and oil constituents.

---

Figure 1:
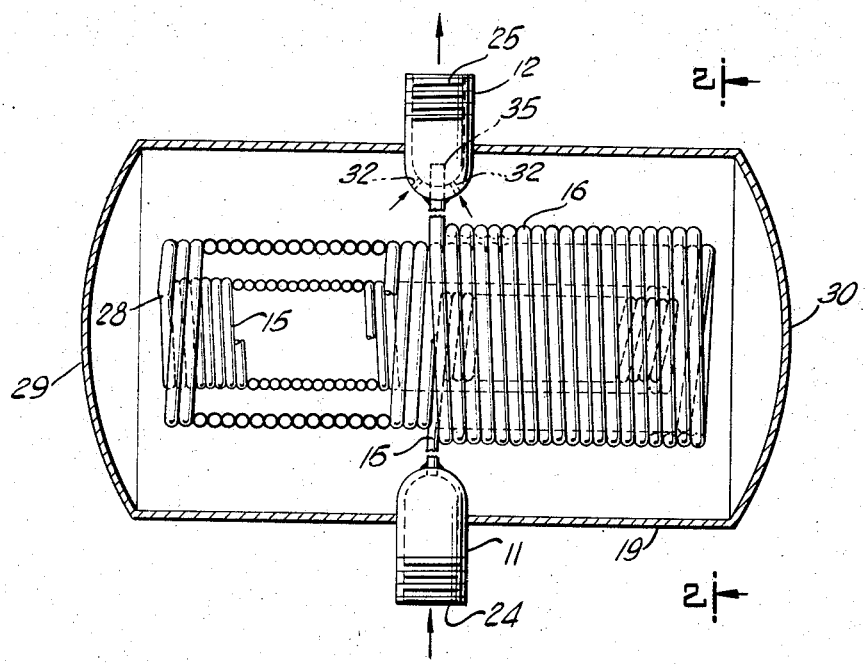

This abstract is required by Rule 72(b) and is not to be taken as limiting the invention in any manner.

This invention concerns apparatus for de-emulsifying flowing fluids in general. More specifically, the apparatus and method according to this invention are particularly applicable to a situation where oil with some water therein is subjected to a substantial pressure drop, which pressure drop in effect tends to create a tight emulsion.

In high pressure producing wells, where the effluent must be reduced in pressure, the ordinary arrangement using a choke for such pressure reduction tends to create a very tight water-in-oil emulsion whenever the producing fluid includes some water along with the oil. It is an object of this invention to avoid this tight choke created emulsion by substituting for the usual pressure reducing choke, an apparatus according to this invention.

Another object of this invention is to provide apparatus which may be substituted for a choke and will provide the reduction in pressure along with a centrifugal flow that will de-emulsify the choke created emulsion so that the effluent will be largely de-emulsified and the separation thereafter will be greatly simplified.

Another object of this invention is to provide apparatus in the nature of a centrifugal separator for two fluids which are subjected to a substantial pressure drop that would tend to create an emulsion of these two fluids. Thus, the invention may be characterized as an oil de-emulsifier using centrifugal force and controlled pressure drops. However, it may be employed wherever applicable.

Briefly, the invention may be described as apparatus for de-emulsifying a mixture of fluids having different specific gravities. The fluids involved are subjected to a relatively high pressure at the inlet and delivered at a relatively low pressure at the outlet of such apparatus. The apparatus comprises in combination a first elongated relatively small cross-section conduit connected to said inlet for reducing the pressure applied to said fluid. The said conduit includes a relatively short radius of curvature for applying centrifugal force to the fluids flowing therethrough. The combination also comprises a second elongated relatively enlarged cross-section conduit connected to the outlet of said first conduit. The said second conduit includes curvature for continuing the application of centrifugal force to said fluid after leaving said first conduit. The combination also comprises means for connecting said second conduit to said low pressure outlet.

Again briefly, the invention concerns apparatus for de-emulsifying a mixture of fluids having different specific gravities, wherein said fluids are subjected to a relatively high pressure at the inlet and delivered at a relatively low pressure at the outlet. The combination comprises in combination a first elongated relatively small cross-section conduit connected to said inlet for reducing the pressure applied to said fluids. The combination also comprises a second elongated relatively enlarged cross-section conduit connected to the outlet of said first conduit. The first and second conduit have curvatures therein which include a plurality of full circle turns. The combination additionally comprises a housing for enclosing both said conduits in order to protect against leaks therein, and includes means for connecting said high pressure inlet to said first conduit. Also, the combination comprises means for draining the interior of said housing wherein said draining means includes a valve for maintaining a fluid tight interior within said housing. In addition, one of said full circle turns of said second conduit, adjacent to said outlet connecting means, has openings therein for releasing the more dense fluid therethrough. The latter is in order to test the effectiveness of the separation of said fluids. The combination additionally comprises at least one orifice in the said outlet connecitng means for drawing the accumulation of less dense fluid out from the upper portion of the interior of said housing.

Figure 2:
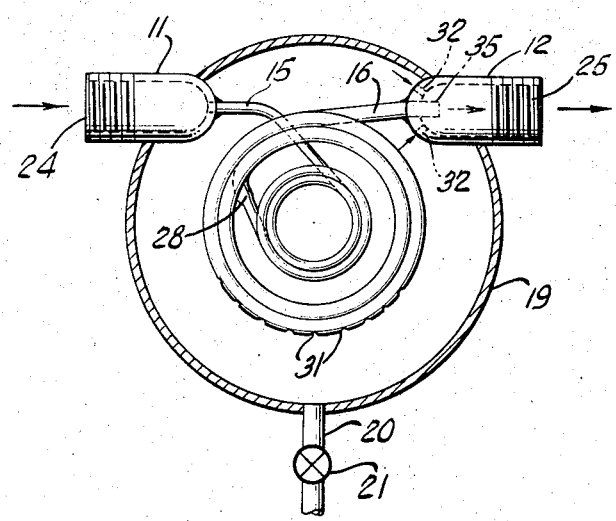

The foregoing and other objects and benefits of the invention will be more fully set forth below in connection with the best mode contemplated by the inventor of carrying out the invention, and in connection with which there are illustrations provided in the drawings, wherein:

FIGURE 1 is a plan view partly in cross-section of one embodiment showing structure according to the invention; and FIGURE 2 is an end or side view, partly in cross-section taken generally along the lines 2—2 of FIGURE 1 looking in the direction of the arrows.

Apparatus according to the invention is illustrated schematically in the figures of the drawings. The combination includes an inlet connector 11 and an outlet connector 12 between which are connected two conduits 15 and 16. These conduits are made up of lengths of tubing which have been formed into compact spirals forming cylindrical units so that the fluid flowing therethrough is subjected to centrifugal force. A reduction in pressure between inlet and outlet, i.e., a choke effect, is obtained by predetermining the size of the tubing in each case. In other words, the inside diameter which is smallest for conduit 15 and considerably larger for conduit 16, is predetermined in each case by proper design to accomplish the desired pressure drop while permitting sufficient quantity of fluid flow. This provides the required choke effect so that the high pressure under which fluid exists at the inlet connector 11 is reduced to a required lower pressure at the outlet 12. At the same time while the pressure reduction or choking effect is accomplished, the centrifugal force applied to the flowing fluid in conduits 15 and 16 tends to separate the constituents of the fluid since they have different specific gravities. As an example, when the apparatus is applied to the output of a flowing high pressure well which includes some water along with oil or other production fluid, the difference in the specific gravity between the oil and water is sufficient to render the separation effects of the circular flow effective in separating these constituent fluids which otherwise tend to become an emulsion.

It will be observed that the apparatus is conveniently enclosed in a housing 19 which protects against leakage. It also will be observed that there is a drain pipe 20 from the bottom of the housing 19, which drain pipe includes a valve 21 connected therein.

Inlet and outlet connectors 11 and 12 may be made up of appropriate sized swages which have pipe threaded exteriors 24 and 25 respectively for connecting the apparatus into a flow line. It is pointed out that the inlet connector 11 has the smaller sized conduit 15 swaged into connection therewith in a standard manner, while outlet connector 12 has the other end of larger sized conduit 16 connected thereto with a welded or swaged connection, as illustrated. The adjacent ends of conduits 15 and 16 are connected together by welding, as indicated at reference numeral 28; and both conduits are formed into a tight spiral, one within the other, as shown in the drawings.

While various sizes for the elements of apparatus according to this invention would be employed, depending upon the specific application for the apparatus; a particular model was constructed with the conduits 15 and 16 being made up of twenty foot lengths of one-quarter inch heavy pipe and one-half inch heavy pipe respectively. These were welded together and bent into a tight spiral as generally illustrated in the drawings. This resulted in about an eighteen inch long unit which was then encased in a twenty inch long piece of ten and three-quarter inch outside diameter casing. Of course, the inlet and outlet swages or connectors 11 and 12 were placed through holes in the casing (housing) and welded therein to provide a tight interior for the housing of the unit. Also, a pair of curved end pieces 29 and 30 were welded onto the ends of the housing 19 to form a fluid tight interior. Furthermore, the drain pipe 20 was connected at the bottom of the housing member with the valve 21 therein, in order to drain the interior as required and for testing purposes as will appear in greater detail below.

It is to be noted that the unit as described so far is applicable to use in the manner described in order to create separation of the constituents of an emulsion which emulsion has been created by conditions involving a fluid under considerable pressure being passed through a choke to reduce the pressure. As is well known this tends to create a tight emulsion of the constituents. Thus, the outlet fluid from this apparatus will have reseparated to a large extent. This, of course, makes the separation thereafter much easier.

It may be desirable to provide for testing the amount of fluid separation that is being obtained with the apparatus. This may be accomplished by employing the structure shown in the drawings that involves provision of a plurality of openings or slots 31 that are cut into the bottom outside of one of the last turns in conduit 16, i.e., just before it is connected into the outlet connector 12. This will allow the separated heavier constituents of the fluid, i.e., water (in the case of an oil-water mixture) to be ejected into the inside of housing 19. In this way the amount of separation being accomplished may be tested by draining off some of the fluid from the housing through drain pipe 20, via valve 21.

When the foregoing structure is employed, i.e., test openings 31, it is advisable to employ also the structure indicated in outlet connector 12. This additional structure acts so that the fluid flowing out from the unit will tend to pick up the separated lighter constituents or constituent, i.e., oil in the indicated case, and draw it through a plurality of orifices 32 that provide openings through the body of the outlet connector 12 on the inside of the housing 19. In order to improve the drawing effect through these orifices, it is preferable to have an extension 35 of the conduit 16 extend a short distance on the inside of outlet connector 12 to provide a jet action that will create lower pressure in the vicinity of the orifices and thus draw fluid from the interior of the housing to join the effluent from the outlet connector 12.

It has been found that apparatus according to this invention is quite effective and very helpful in avoiding a tight emulsion condition following the reduction in pressure from a high pressure oil well. Heretofore such reduction has been accomplished through a mere choke. It is, of course, clear that the benefits are substantial because it is quite a simple matter to separate free oil and water as contrasted to the separation of a tight choke created emulsion.

While particular embodiments of the invention have been described in considerable detail in accordance with the applicable statutes, this is not to be taken in any way as limiting the invention, but merely as being descriptive thereof.

I claim:

1. Apparatus for de-emulsifying a mixture of fluids having different specific gravities, said fluids being subjected to a relatively high pressure at the inlet and delivered at a relatively low pressure at the outlet, comprising in combination a first elongated relatively small cross-section conduit connected to said inlet for reducing the pressure applied to said fluids, said conduit including a large plurality of full circle turns having a relatively short radius of curvature therein for applying centrifugal force to the fluids flowing therethrough, said first conduit turns forming a cylindrical unit having a substantially horizontal axis, a second elongated relatively enlarged cross-section conduit connected to the outlet of said first conduit, said second conduit including a large plurality of full circle turns having curvature for continuing the application of centrifugal force to said fluids after leaving said first conduit and means for withdrawing the higher specific gravity fluid therefrom, said second conduit turns forming a cylindrical unit surrounding said first conduit unit and being substantially coaxial therewith, and means for connecting said second conduit to said low pressure outlet.

2. A combination according to claim 1 further including a housing for enclosing both said conduits in order to protect against leaks.

3. A combination according to claim 2 wherein one of said full circle turns of said second conduit adjacent to said outlet connecting means has openings therein for releasing the higher specific gravity fluid therethrough in order to test the effectiveness of the separation of said fluids, and further including at least one orifice in said outlet connecting means for drawing the accumulation of lower specific gravity fluid out from the upper portion of the interior of said housing.

References Cited
UNITED STATES PATENTS

| | | | |
|---|---|---|---|
| 2,191,190 | 2/1940 | De Guire | 210—512 X |
| 2,311,869 | 2/1943 | Rhoads | 138—43 |
| 2,816,662 | 12/1957 | Nylen | 210—304 X |

REUBEN FRIEDMAN, *Primary Examiner.*

J. DECESARE, *Assistant Examiner.*